Oct. 23, 1923.
W. B. BRASSINGTON
VALVE
Filed Feb. 28, 1921
1,471,444
2 Sheets-Sheet 1
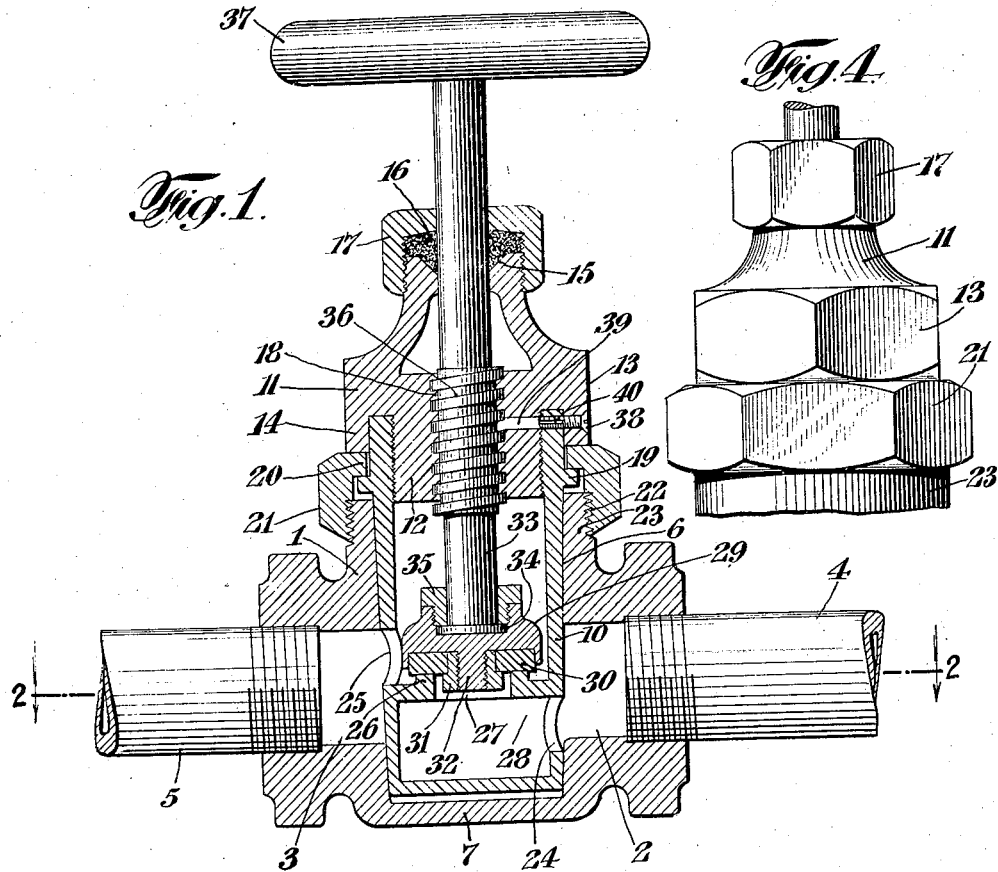
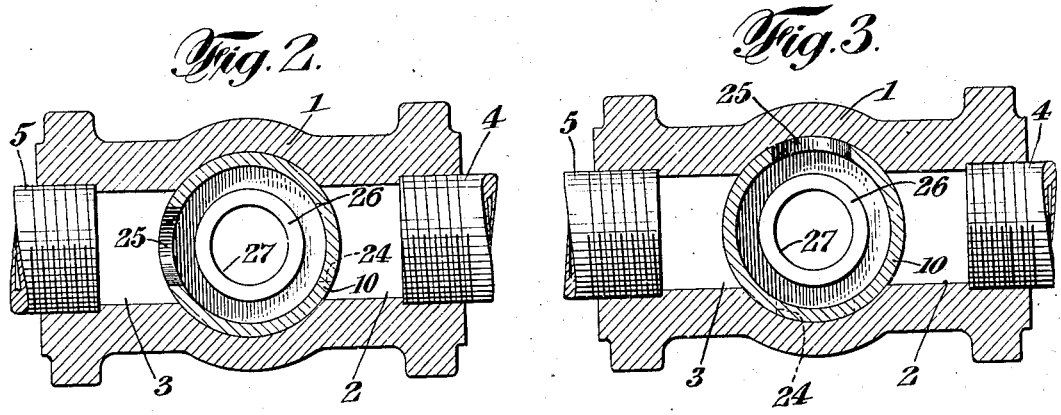
INVENTOR
William B. Brassington
BY
Louis Prewost Whitaker
ATTORNEY Oct. 23, 1923.  1,471,444
W. B. BRASSINGTON
VALVE
Filed Feb. 28, 1921  2 Sheets-Sheet 2
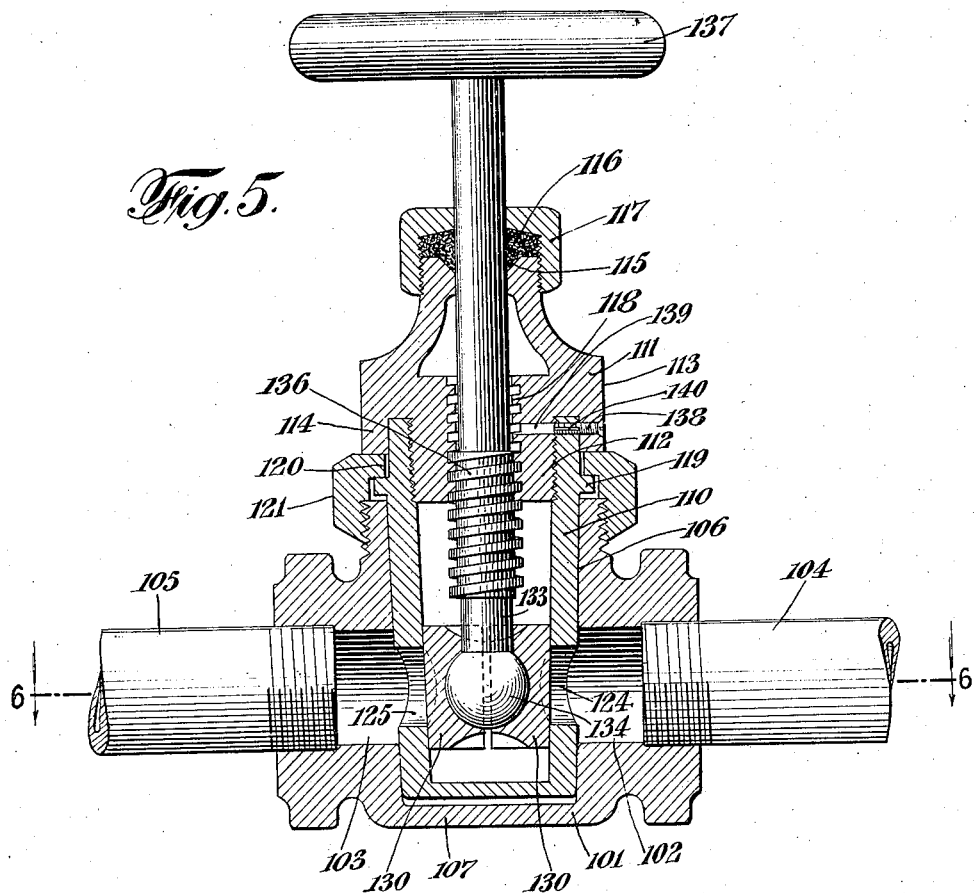
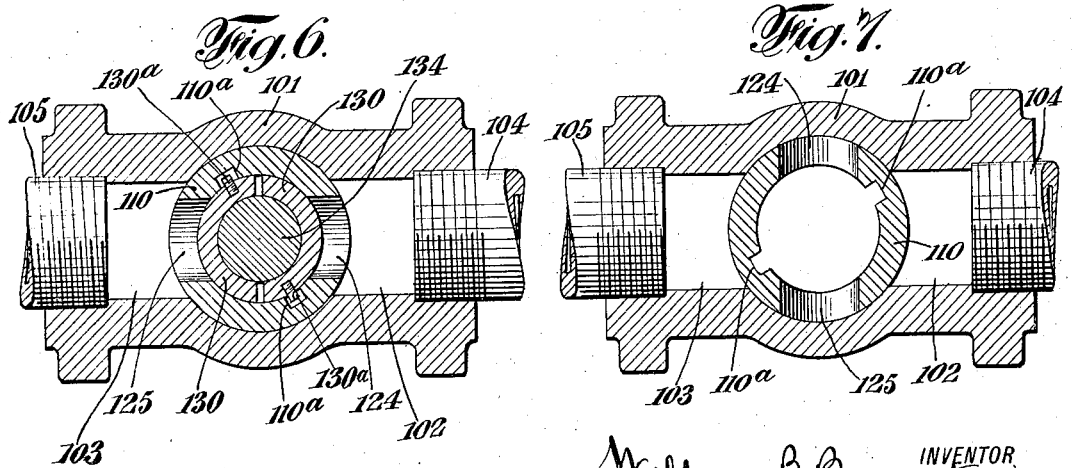

Patented Oct. 23, 1923.

1,471,444

UNITED STATES PATENT OFFICE.

WILLIAM B. BRASSINGTON, OF PORT RICHMOND, NEW YORK.

VALVE.

Application filed February 28, 1921. Serial No. 448,310.

*To all whom it may concern:*

Be it known that I, WILLIAM B. BRASSINGTON, a citizen of the United States, residing at Port Richmond, in the county of Richmond and State of New York, have invented certain new and useful Improvements in Valves; and I do hereby declare the following to be a full, clear, and exact description of the invention, such as will enable others skilled in the art to which it appertains to make and use the same.

My invention consists in the novel features hereinafter described, reference being had to the accompanying drawings which illustrate two embodiments of the invention selected by me for purposes of illustration and the said invention is fully disclosed in the following description and claims.

In the use of valves in steam lines and other lines, leaks often develop on account of defects or wear in the valve stem packing or due to the failure of the valve to properly seat owing to injuries to the valve seat or to the valve itself, which cannot be conveniently repaired owing to the fact that access cannot be had to the valve seat and valve without discontinuing the use of the entire pipe line, and in some instances putting the plant or a portion of the plant out of commission. This is especially true in steam lines, particularly in relation to the valves thereof nearest the source of supply and as a result in thousands of instances valves are permitted to remain in a leaky condition, with the consequent wastage of steam or other fluid passing through the line, and resulting in a corresponding loss of efficiency in the operation of the line, and in the case of steam valves, resulting in a waste of fuel.

The object of my invention is to provide a valve which is so constructed that it may be repaired at any time by repacking the valve stem, or by removing the valve and renewing it or regrinding it, or by regrinding the valve seat, or otherwise, in order to maintain the valve in its highest state of efficiency, and without the necessity of more than temporarily interfering with the operation of the line. To this end I provide the valve casing with a slightly tapered aperture arranged transversely to the axis of the inlet and outlet apertures of the casing, and in this tapered aperture I fit a rotatable sleeve having its exterior surface slightly tapered so as to make an absolutely tight joint with the aperture in the casing. This sleeve is preferably closed at its inner end and is provided with inlet and outlet apertures adapted to be placed in registration with the inlet and outlet apertures of the valve casing when the sleeve is in its normal position. Within this sleeve I provide a main valve which may be a disk valve or a gate valve, which is constructed and arranged to control the passage of fluid through the sleeve from the inlet aperture to the outlet aperture thereof, this main valve being entirely carried by the sleeve and having a threaded stem passing through a closure applied to the outer end of the sleeve and provided with the usual packing and packing gland. The closure for the sleeve is preferably secured rigidly to the sleeve, as by a set screw engaging registering threaded apertures in the closure and sleeve, and the sleeve is capable of being given a partial rotation sufficient to bring its inlet and outlet apertures into alignment with the solid portions of the casing, as by giving the sleeve a quarter turn, thereby completely closing the inlet and outlet apertures of the sleeve as well as the inlet and outlet apertures of the casing, which are closed by the walls of the sleeve. When the sleeve is in this position, the main valve can be removed for repair or adjustment, or the old packing can be replaced with new, or the valve seat ground without permitting the escape of the fluid and without discontinuing the use of the line any longer than is required for the actual repair. I also provide the sleeve with a suitable venting device so that when the device is actuated so as to cut off communication between the inlet and outlet apertures of the casing, any accumulated pressure within the sleeve may be relieved to the atmosphere so as to avoid injury to the operator in removing the main valve.

I also provide means, preferably in the form of a jack nut, having a threaded engagement with the valve casing and engaging in an annular groove which the combined sleeve and its closure provides for moving the sleeve longitudinally to force it into its tapered seat, and to move it slightly therefrom to loosen it in order to facilitate turning it when it is desired to repair the interior main valve.

In the accompanying drawings,

Fig. 1 represents a vertical sectional view of a valve embodying my invention and having a main valve of the disk type.

Fig. 2 represents a horizontal section on the line 2—2 of Fig. 1, with the main valve removed.

Fig. 3 is a similar view showing the parts illustrated in Fig. 2 with the sleeve rotated a quarter turn so as to cut off communication between the inlet and outlet apertures of the sleeve and the casing.

Fig. 4 is an exterior view of the follower or packing gland, the plug for closing the sleeve, the jack nut, and a portion of the casing, and main valve stem.

Fig. 5 is a view similar to Fig. 1 showing the sleeve provided with a gate valve which forms the main valve of the construction.

Fig. 6 is a horizontal section on the line 6—6 of Fig. 5.

Fig. 7 is a view similar to Fig. 6 showing the sleeve rotated a quarter turn and the gate valve removed.

Referring to the embodiment of my invention shown in Figs. 1, 2 and 3, 1 represents the valve casing, which is provided with the inlet and outlet apertures, 2 and 3 respectively, which are preferably threaded in the usual manner for the reception of the pipes 4 and 5, which may constitute portions of a pipe line for conveying steam or other fluid or liquid. The valve casing is provided internally with a slightly tapered valve aperture, indicated at 6, closed at the bottom, as at 7, but open at the top, the said aperture 6 having its axis disposed transversely to the axis of the inlet and outlet apertures. In this valve aperture 6 is tightly fitted a sleeve 10, the exterior of which is slightly tapered to fit the aperture 6, and the sleeve 10 does not extend quite to the bottom of the aperture and is closed at its inner end, as clearly indicated in Fig. 1. The sleeve 10 is open at the top and is provided with a closure consisting in this instance of a plug 11, which is provided with a threaded portion 12 engaging exterior screw threads in the upper end of the sleeve. The exterior of the plug is preferably hexagonal, as indicated at 13, to facilitate the use of a wrench thereon, and the plug is preferably provided with a downwardly extending portion 14 outside of the sleeve. The upper portion of the plug 11 is provided with the usual stuffing box, comprising a packing recess 15 in which is located the usual packing 16 enclosed between the packing recess and a threaded follower or packing gland 17 having an exterior hexagonal form and interiorly threaded to engage a threaded portion on the upper end of the plug. The plug 11 is provided interiorly with coarse screw threads, indicated at 18 for the threaded portions of the valve stem, as hereinafter described. The sleeve 10 projects above the upper portion of the casing, and is provided with an annular projecting flange 19 forming an annular groove between it and the exterior portion 14 of the plug. This annular groove receives an inwardly extending flange 20 of a jack nut 21 also having a hexagonal exterior form, the lower portion of this jack nut being internally threaded, as at 22, to engage a threaded portion 23 on the upper portion of the casing, so that by turning the jack nut the sleeve 10 can be forced very tightly down into the recess 6, and by turning the jack nut in the opposite direction the sleeve can be loosened in its tapered aperture 6 which will be desirable when it is intended to turn the sleeve, as hereinafter described. The sleeve 10 is provided with an inlet aperture 24 and an outlet aperture 25 to permit of the passage of fluid through the sleeve from the inlet aperture 2 to the outlet aperture 3 of the casing. The passage of fluid through the sleeve is controlled by the main valve, which in this instance is in the form of a disk valve, and engages a seat 26 surrounding a communicating aperture 27 in a partition 28 provided within the sleeve between the inlet and outlet apertures thereof. In the form of valve shown in these figures, 29 represents the metal valve body provided on its lower face with an annular recess to receive the valve proper, indicated at 30, which may be of fibre, rubber, soft metal or other suitable material, held in place by a shouldered nut 31, on a threaded stem 32 with which the lower side of the valve body is provided. The upper side of the valve body is provided with a central recess to receive the lower end of a valve stem 33 provided at its lower end with an enlargement 34 held in place by a threaded sleeve 35. The valve stem is provided with coarse threads, indicated at 36, engaging the threads 18 of the plug, and the valve stem extends through the stuffing box before described, and is provided at its outer end with a hand wheel 37 or other suitable means by which it may be rotated to raise and lower the main valve.

The sleeve 10 will normally be so adjusted that the inlet and outlet apertures thereof will be in registration or communication with the inlet and outlet apertures of the valve casing, as indicated in Figs. 1 and 2, and the jack nut 21 will be turned so as to cause the flange 20 thereof to press the sleeve firmly in the tapered recess 6 of the valve casing, making an absolutely tight joint. When it is desired to repair the valve, it is only necessary to rotate the sleeve 10 a quarter turn into the position indicated in Fig. 3 in order to bring the inlet and outlet apertures 24—25 thereof opposite the solid walls of the casing, and the imperforate portions of the sleeve opposite the inlet and outlet apertures of the casing, in order to prevent the passage of fluid through the valve and sleeve and permit the removal of the main valve if necessary, or the repacking of the stuffing box. In order to effect the partial rotation of the sleeve 10 it will be necessary ordinarily to loosen it in its seat, and this can be conveniently done by turning the jack nut 21 in a direction to unscrew it, thereby raising the sleeve sufficiently to enable it to be readily turned, when it may be again forced into its seat if necessary. In order to facilitate the turning of the sleeve 10 I prefer to secure the plug 11 and the sleeve together, and this is conveniently accomplished by means of a set screw 38 extending through registering apertures in the plug and sleeve. After the sleeve 10 has been given a quarter turn to the position indicated in Fig. 3 the screw 38 can be removed sufficiently to allow the plug 11 to be unscrewed if it is desired to remove the main valve and the valve can be renewed and a new valve 30 installed, and if the valve seat 28 has become injured, a suitable tool can be introduced into the upper end of the sleeve which affords a wide opening for such a tool and the valve seat can be dressed so as to form a perfectly tight joint with the valve.

Where a valve of this character is used on a high pressure line it may readily happen that when the sleeve 10 is turned to the position indicated in Fig. 3, the sleeve may remain filled with fluid under pressure, which, unless relieved, might cause injury to the operator in removing the plug 11. I therefore prefer to provide means for venting the interior of the sleeve. To this end I provide a vent passage or aperture 39 communicating with the interior of the sleeve and normally closed by a suitable closure, as a screw plug, in this instance the screw plug 38 being employed for this purpose. As herein shown, the vent passage 39 forms a continuation of the registering apertures in the sleeve and plug and leads to the coarsely threaded portion of the plug, there being sufficient space between the threaded portions of the plug and the valve stem to permit of the escape between them of accummulated pressure fluid. I also prefer to provide the screw 38, adjacent to its inner end, with a kerf, groove, or flattened portion 40, which is normally closed when the screw is in its innermost position. The screw 38 may, however, be unscrewed so as to bring the outer end of the groove 40 into communication with the atmosphere and forming a minute opening communicating with the interior of the sleeve through which any accumulated pressure fluid may escape in such a small stream that it will not effect any injury. As will be obvious, the vent passage 39 also indicates whether or not the sleeve has been rotated far enough to entirely cut off communication with the pressure line. If the sleeve has not been turned far enough to entirely close the inlet and outlet apertures thereof, the removal of the closure or screw 38 for the vent passage would be followed by a continuous escape of a small stream of pressure fluid which would indicate to the operator that the sleeve had not been entirely closed and thus prevent him from attempting to remove the plug 11. If, on the contrary, the sleeve has been entirely closed off, the removal of the vent closure 38 will be followed by a slight discharge of pressure fluid to relieve the interior of the sleeve after which such discharge will cease, thus advising the operator that the sleeve is in its closed position. The screw 38 therefore effects a double purpose in the construction shown, of locking the sleeve and plug together, and at the same time serving as a closure for the vent passage. After the valve has been repaired and replaced and the screw 38 restored to its normal position, indicated in Fig. 1, a wrench is applied to the exterior of the plug 11 so as to partially rotate the sleeve 10 back into the position indicated in Figs. 1 and 2, and the jack nut is turned down to firmly seat the sleeve in its tapered aperture 6, when the valve is fully restored to its normal condition, and the only interruption to the pipe line will be for the brief time required to effect the actual repairs.

In the form of my invention illustrated in Figs. 5, 6 and 7, I have shown the rotatable sleeve provided with a vertically movable gate valve instead of the disk valve illustrated in the other figures. In this form of my invention the valve casing is illustrated at 101, provided with inlet and outlet passages 102 and 103, to receive the pipes 104 and 105, and the casing is provided with the tapered aperture 106 closed at its bottom, as at 107, which receives the tapered sleeve 110, the upper end of which is provided with plug 111 having the threaded portion 112 and the exterior hexagonal portion 113, and provided with the depending flange 114, the packing recess 115, the packing 116, and the follower 117. The interior of the plug is provided with the coarse threads 118, and the exterior of the sleeve is provided with the annular flange 119 forming an annular groove between it and the lower edge of the depending flange 114 of the plug, to receive the flange 120 of the jack nut 121, all of said parts being constructed substantially as previously described, except that the interior of the sleeve 110 is provided with a slightly tapered bore extending to the closed bottom of the sleeve, and the sleeve in this instance is provided with inlet and outlet apertures 124—125 respectively, adapted to be brought into registration with the inlet and outlet apertures of the casing, and being in this instance located opposite each other and coaxially arranged. The interior of the sleeve is provided with a pair of vertically movable gates 130 preferably formed by transversely dividing a block or plug adapted to fit the interior of the sleeve. the gate valve sections 130 being provided on their inner faces with substantially hemispherical recesses to fit the ball 134 on the lower end of the valve stem 133, which is provided with a coarsely threaded portion 136, engaging the interior threads 118 of the plug, the valve stem extending up through the stuffing box at the top of the plug and being provided with the hand wheel 137 for turning the stem. The gate valve is so constructed that when pushed down to its lowest position, it will close the apertures 124—125 in the sleeve, as shown in Fig. 5, and when the valve stem is rotated in the proper direction, the gate valve sections will be raised so as to open the apertures 124—125. Suitable means are provided for preventing the rotation of the gate valve sections 130 with respect to the sleeve 110. This may be accomplished in any desired manner. In the present instance I have shown the sleeve 110 provided with vertically disposed guiding grooves 110ª (see Figs. 6 and 7) to receive projections 130ª secured to the gate valve sections 130 and comprising, preferably, threaded plugs or screws which can be removed if desired. This construction is convenient as it permits the grinding of the interior of the sleeve and also the grinding of the exterior of the gate valve sections, so that an accurate fit of the same can be secured.

In the normal operation of the valve shown in Figs. 5 to 7, the sleeve 110 will occupy the position shown in Figs. 5 and 6 with the apertures 124—125 in substantial registration with the inlet and outlet apertures of the valve casing. The gate valve may be raised and lowered by means of the valve stem to open and close the apertures 124—125 and permit the passage of fluid through the valve or cut it off as desired. When it is desired to repair the valve, it is only necessary to rotate the sleeve 110 a quarter turn, into the position indicated in Fig. 7, when the apertures 124—125 will be closed by the solid side walls of the recess 106 of the valve casing and the solid portions of the sleeve will close the inlet and outlet apertures 102 and 103 of the valve casing. As before described, it is convenient to employ a jack nut 121 in loosening the sleeve 110 in its seat before turning it and in forcing it firmly into this seat after it is returned to its normal position. I also provide in this form of valve, the vent passage 139 in the plug communicating with the interior threaded portions, and arranged in communication with registering apertures in the sleeve 110 and the outer flange 114 of the plug, which receive the locking screw 138, said locking screw being provided with the relief groove or kerf, indicated at 140, so that by backing out the screw 138 far enough to expose the outer end of the groove 140, accumulated pressure within the sleeve 110 may be relieved before taking out the valve mechanism.

What I claim and desire to secure by Letters Patent is:—

1. The combination with a valve casing, provided with inlet and outlet apertures, a rotatable sleeve in said casing, provided with inlet and outlet apertures adapted to be brought into registration with the inlet and outlet apertures of the casing, a main valve located in the sleeve for controlling the passage of fluid therethrough, a closure for the outer end of said sleeve having a threaded engagement therewith and provided with a stuffing box, a valve stem for the main valve extending through the said closure and stuffing box, said sleeve and closure being provided with registering apertures, one of said apertures being connected to an opening through the closure for venting the sleeve, said apertures forming part of a vent passage from the interior of the sleeve to the exterior of the valve, and a closure for said vent passage having a part engaging in said apertures and locking the sleeve and closure in fixed relation for joint rotation.

2. The combination with a valve casing provided with inlet and outlet apertures, a rotatable sleeve in said casing provided with inlet and outlet apertures, adapted to be brought into registration with the inlet and outlet apertures of the casing, a main valve located in the sleeve for controlling the passage of fluid therethrough, a plug having a threaded engagement with the sleeve for closing the sleeve at one end thereof, said plug being provided externally with a polygonal portion, a valve stem extending through an aperture in said plug, and being connected to the main valve, said sleeve and plug being provided with registering apertures forming a passage extending to the stem aperture of the plug, and a locking screw extending through said registering apertures to lock the sleeve and plug together for joint rotation, said registering apertures forming part of a vent passage communicating through the stem aperture of the plug with the interior of the sleeve, and said screw forming the closure for said vent passage.

3. The combination with a valve casing provided with inlet and outlet apertures, a sleeve in said casing provided with means for passing the fluid therethrough on its way from the inlet aperture to the outlet aperture of the casing, a main valve located in the sleeve, for controlling the passage of fluid therethrough, a closure for said sleeve having a threaded engagement therewith, and provided with a stuffing box, a valve stem for the main valve extending through said closure and stuffing box, said sleeve and closure being provided with registering threaded apertures, one of said apertures being connected to the interior of the closure for venting the sleeve, and a screw engaging said registering apertures and locking the sleeve and closure in fixed relation, said screw being provided with a venting recess normally closed when the screw is in normal operative position.

4. The combination with a valve casing, provided with a tapered aperture open at one end and closed at the other, said casing having inlet and outlet apertures communicating with said tapered aperture, of a rotatable sleeve closed at its inner end, fitting said tapered aperture of the casing, and provided laterally with inlet and outlet apertures adapted to normally register with those of the casing, but capable of being closed by a partial rotation of the sleeve, a main valve carried by said sleeve for closing the communication between the inlet and outlet apertures thereof, a closure for the outer end of said sleeve, a valve stem for the main valve extending through said closure, and a jack nut having a threaded engagement with the valve casing and provided with a flange member rotatable with respect to said sleeve, and lying between parts of the sleeve and closure, whereby said jack nut may be rotated to move the sleeve longitudinally in both directions.

5. The combination with a valve casing, provided with a tapered aperture open at one end and closed at the other, said casing having inlet and outlet apertures communicating with said tapered aperture, of a rotatable sleeve closed at its inner end, fitting said tapered aperture of the casing, and provided laterally with inlet and outlet apertures adapted to normally register with those of the casing, but capable of being closed by a partial rotation of the sleeve, a main valve carried by said sleeve for closing the communication between the inlet and outlet apertures thereof, said sleeve being provided outside of the casing with an annular flange, a jack nut having a threaded engagement with the valve casing, and a flange member rotatable with respect to the sleeve and adapted to engage the outer face of said flange on said sleeve, a plug for closing the outer end of the sleeve, provided with a portion for engaging the outer face of the flange member of said jack nut, means for locking said plug and the sleeve together for joint rotation, said plug being provided with a polygonal portion to be engaged by a wrench, and a valve stem extending through said plug and connected with the main valve for operating the same.

6. The combination with a valve casing provided with a tapered aperture, and inlet and outlet apertures communicating therewith, of a rotatable sleeve fitting said tapered aperture of the casing, and provided with inlet and outlet apertures, adapted to normally register with those of the casing, but capable of being closed by a partial rotation of the sleeve, a main valve carried by said sleeve for closing communication between the inlet and outlet apertures thereof, a closure for the outer end of the sleeve, a valve stem extending through the closure and connected with the main valve, said sleeve and closure being provided with portions forming an annular groove between them, and a jack nut having a threaded engagement with the casing and provided with a flange engaging in said annular groove for moving said sleeve longitudinally in both directions.

7. The combination with a valve casing provided with a tapered aperture, and inlet and outlet apertures communicating therewith, of a rotatable sleeve fitting said tapered aperture of the casing, and provided with inlet and outlet apertures, adapted to normally register with those of the casing, but capable of being closed by a partial rotation of the sleeve, a valve stem extending through said sleeve coaxially thereof and provided with a threaded portion, a part connected with said sleeve, surrounding said valve stem and having a threaded portion engaging the threaded portion of the valve stem, gates in said sleeve, connected with the valve stem and adapted to close the inlet and outlet apertures of the sleeve, a jack nut engaging said casing and having a rotatable engagement with the sleeve and the part connected with said sleeve, the parts rotatively engaged by the jack-nut forming an annular groove, said sleeve being provided with a venting aperture, and means for normally closing said venting aperture.

8. The combination with a valve casing provided with a tapered aperture, and inlet and outlet apertures communicating therewith, of a rotatable sleeve fitting said tapered aperture of the casing, and provided with inlet and outlet apertures, adapted to normally register with those of the casing, but capable of being closed by a partial rotation of the sleeve, a gate valve located in said sleeve and movable longitudinally of the axis thereof for controlling the inlet and outlet apertures of the sleeve, said gate valve comprising separated members provided with exterior surfaces fitting the interior of the sleeve, and means for preventing relative rotation between the gate valve members and the sleeve.

9. The combination with a valve casing provided with a tapered aperture, and inlet and outlet apertures communicating therewith, of a rotatable sleeve fitting said tapered aperture of the casing, and provided with inlet and outlet apertures, adapted to normally register with those of the casing, but capable of being closed by a partial rotation of the sleeve, a gate valve located in said sleeve and movable longitudinally of the axis thereof for controlling the inlet and outlet apertures of the sleeve, said gate valve comprising separated members provided with exterior surfaces fitting the interior of the sleeve, the interior of the sleeve being provided with a longitudinal groove and the adjacent gate valve member being provided with a detachable projection for engaging in said groove to prevent relative rotation between the gate valve members and the sleeve, while permitting the necessary grinding of the cooperating surface of the valve and sleeve.

In testimony whereof I affix my signature.

WILLIAM B. BRASSINGTON.